(12) United States Patent
Giese et al.

(10) Patent No.: US 9,481,778 B2
(45) Date of Patent: Nov. 1, 2016

(54) INITIATOR-TIGHTENED COMPOSITIONS

(75) Inventors: Roger W. Giese, Quincy, MA (US); Gang Shao, Malden, MA (US)

(73) Assignee: Northeastern University, Boston, MA (US)

( * ) Notice: Subject to any disclaimer, the term of this patent is extended or adjusted under 35 U.S.C. 154(b) by 1140 days.

(21) Appl. No.: 13/395,325

(22) PCT Filed: Sep. 9, 2010

(86) PCT No.: PCT/US2010/048280
§ 371 (c)(1),
(2), (4) Date: Aug. 8, 2012

(87) PCT Pub. No.: WO2011/031866
PCT Pub. Date: Mar. 17, 2011

(65) Prior Publication Data
US 2012/0302653 A1   Nov. 29, 2012

Related U.S. Application Data

(60) Provisional application No. 61/240,714, filed on Sep. 9, 2009.

(51) Int. Cl.
*C08L 33/26*   (2006.01)
*C08J 9/34*   (2006.01)
*C08J 3/24*   (2006.01)
*B01J 20/285*   (2006.01)
*B01J 20/291*   (2006.01)

(52) U.S. Cl.
CPC .............. *C08J 9/34* (2013.01); *B01J 20/285* (2013.01); *B01J 20/291* (2013.01); *C08J 3/245* (2013.01); *B01J 2220/64* (2013.01); *B01J 2220/86* (2013.01); *C08J 2205/022* (2013.01); *C08J 2333/26* (2013.01)

(58) Field of Classification Search
CPC .. B01J 20/285; B01J 20/291; B01J 2220/64; B01J 2220/86; C08J 3/245; C08J 9/34; C08J 2205/022; C08J 2333/26
See application file for complete search history.

(56) References Cited

U.S. PATENT DOCUMENTS

| | | | |
|---|---|---|---|
| 4,189,370 A | 2/1980 | Boschetti | |
| 4,790,919 A | 12/1988 | Baylor, Jr. | |
| 4,968,535 A | 11/1990 | Terai et al. | |
| 4,978,713 A | 12/1990 | Goldenberg | |
| 6,414,214 B1 | 7/2002 | Engelhardt et al. | |
| 8,754,564 B2 * | 6/2014 | Bennett et al. | 310/216.092 |
| 2003/0027965 A1 | 2/2003 | Solomon et al. | |
| 2007/0068816 A1 | 3/2007 | Solomon et al. | |

FOREIGN PATENT DOCUMENTS

DE   10204937 A1   8/2003

OTHER PUBLICATIONS

International Search Report and Written Opinion Issued by the U.S. Patent and Trademark Office as International Searching Authority for International Application No. PCT/US10/48280 mailed Oct. 28, 2010 (9 pgs.).
Extended European Search Report Issued by the European Patent Office in Application No. 10816081.3 mailed Dec. 4, 2013 (7 pgs.).
Peterson, et al., "Dual-Function Microanalytical Device by In Situ Photolithographic Grafting of Porous Polymer Monolith: Integrating Solid-Phase Extraction and Enzymatic Digestion for Peptide Mass Mapping," Anal. Chem. vol. 75, pp. 5328-5335 (2003).

* cited by examiner

*Primary Examiner* — Irina S Zemel
(74) *Attorney, Agent, or Firm* — Posternak Blankstein & Lund LLP (57) ABSTRACT

Disclosed herein are gel and plastic compositions comprising tightened layers of polymerized vinyl monomers, as well as methods of making the same, where the layers are tightened in having smaller pores. The tightened layers comprise tightened inner layers and exterior layers, and the compositions comprise polymer-attached (pendant) initiator or helper residues.

8 Claims, 5 Drawing Sheets

INITIATOR-TIGHTENED COMPOSITIONS

CROSS REFERENCE TO RELATED APPLICATIONS

This application claims the benefit of U.S. Provisional Patent Application Ser. No. 61/240,714, entitled "Hydrogel With Initiator-Tightened Surface," filed Sep. 9, 2009. The entirety of the provisional patent application is incorporated herein by reference.

STATEMENT REGARDING FEDERALLY-SPONSORED RESEARCH OR DEVELOPMENT

The present invention was made with United States government support under Grant No. R44RR018054 awarded by the National Institute of Health (STTR grant awarded to Orbital Biosciences). The United States government has rights in this invention.

BACKGROUND

The absence of highly porous, uniformly nanoporous surfaces places limitations on handling, fractionating, extracting, recovering and concentrating aqueous and non-aqueous samples of chemicals and biological substances, both soluble and insoluble. For example, if the surface is not highly porous, then a process that depends on the surface porosity will be slowed down. A surface that is not nanoporous is limited in its ability to provide size separations or retentions involving dissolved nanosubstances, especially if the size of the pores is not uniform. The porosity, size and shape of a surface for one sample will not be suitable for all samples and processes, making control of these surface properties important. A surface that is non-polar or not highly hydrophilic is prone to causing adsorption losses of nanosubstances that are more or less non-polar from aqueous samples. Such adsorption can build up to clog the surface. A surface that is not highly nonpolar is limited in its ability to process nonaqueous samples. Every known bulk, porous surface is limited in one or more of these properties.

Commercially-obtainable, nonhydrogel membranes are commonly prepared by a phase separation process in many pore sizes. These membranes are always non-polar to some degree, associated with their strength and flexibility, and the pores when abundant in the nano regime always range in size. Losses of nanosubstances on such membranes either due to adsorption near, into or onto size-complementary pores, or via flow through the larger pores, are common. This is particularly true for smaller nanosubstances such as peptides and oligosaccharides. When a small nanosubstance is relatively pure and present in a low concentration in an aqueous sample, recovery may not great as other substances in a pure sample are lacking that ordinarily can block some of the adsorption sites, or fill the larger pores, to help recovery of the nanosubstance of interest when placed in contact with the membrane.

The detection of nanosubstances such as peptides and oligosaccharides by mass spectrometry is compromised by the performance of current porous surfaces for size-based purification as for desalting which generally is needed to get the best signals.

The surface problem also is present in size exclusion chromatography, where it has been not possible to fabricate a narrow pore size distribution in chromatographic media such as particles or monoliths. Thus, these columns for preparative size exclusion separations have extra wide diameters since the pores of interest are only a fraction of the overall range of pores that the columns provide.

Grafting and other treatments of gel surfaces also have been unsuccessful in reducing surface pores uniformly, reproducibly, and in a controlled fashion, since the starting pores are heterogeneous, and grafting anyway tends to give a heterogeneous surface. While the surface of a hydrogel has been toughened by ambient treatment with hydrogen peroxide, the permeability as desired was maintained or increased, not reduced with formation of uniform pores.

Known size exclusion techniques and products give a mixed-mechanism separation due to nonpolar or ionic sites on the packings, which complicates or interferes with separation. Adding a non-polar organic co-solvent or salt to an aqueous sample does not completely overcome the issues presented by the technology and introduces other problems.

Accordingly, there remains a need for surfaces which allow for size exclusion techniques for particles of small molecular size with little or no loss of sample due to sticking to the surface and which provide a high capacity for a sharp separation based on size. Once the size difference between small particles dips below two-fold, separation by size exclusion begins to fail with current chromatographic packings. There also is a need for plastic chromatographic surfaces which avoid or minimize the problem of micorpores that causes chromatographic band broadening and losses for small analytes. In other words, a method is needed that fills in or closes these pores, and in a uniform way.

SUMMARY

The present disclosure provides, in part, a surface that overcomes certain limitations of known surfaces and has at least the following properties: highly porous or nonporous, nanoporous when porous (about 1 nm-10 nm), uniform pore size when porous, controllable and reproducible pore size when porous, controllable in bulk size and shape, and controllable in degree of hydrophilicity. The disclosed compositions and methods offer advantages over current size-exclusion chromatographic and membrane media. The disclosed compositions and methods overcome the mixed-mechanism and pore heterogeneity limitations of current chromatographic packings for aqueous and nonaqueous size exclusion and adsorption separations including improved de-salting of small particle samples as by dialysis.

Aspects of the disclosed compositions include a gel comprising a polymer composed of monomers. The polymer further comprises an exposed surface layer of polymerized monomers and having a lower porosity (smaller pores) than the porosity of an interior layer that is composed of the polymer. The exposed surface layer and interior layer have a plurality of polymer-attached initiator residues or polymer-attached helper residues. In some embodiments, the exposed surface layer and interior layer have a combinations of polymer-attached initiator residues and polymer-attached helper residues.

In certain embodiments, the gel comprises vinyl monomers. In other embodiments, the gel comprises non-vinyl monomers.

In other aspects, a hydrogel is disclosed. The hydrogel comprises polymerized vinyl monomers forming a vinyl polymer (and in some embodiments, more than one vinyl polymer) and an exposed surface layer of polymerized vinyl monomers. The polymerized vinyl monomers form a vinyl polymer. The exposed surface layer has a lower porosity than the porosity of an interior layer, where both layers comprise polymerized vinyl monomers that form a vinyl polymer. Both the exposed surface layer and interior layer have a plurality of polymer-attached initiator residues, polymer-attached helper residues, or a combination thereof. The vinyl polymer of the exposed surface layer further has a higher content of polymer-attached initiator residues, polymer-attached helper residues, or a higher content of the combination polymer-attached initiator residues and helper residues than the vinyl polymer of the interior layer.

In certain embodiments, the polymer-attached initiator residues come from two different initiator residues. In particular embodiments, the polymer-attached initiator residues are sulfate and/or hydroxy and the polymer-attached helper is N,N,N',N'-tetramethylethylenediamine lacking a hydrogen atom on a carbon atom. In further embodiments, the porosity of the exposed surface layer allows retention of a particle (e.g., a nucleic acid (including oligonucleotides), glycan, or a peptide, including polypeptides, such as bradykinin) of about 1 kDa.

In some embodiments, the vinyl polymer has a plurality of polymer-attached vinyl groups attached thereto. In particular embodiments, a ratio of polymer-attached initiator or helper residues to polymer-attached vinyl groups in at least one portion of the hydrogel is greater than 10, and in certain instances is greater than 100.

Other aspects disclosed herein relate to methods of forming a hydrogel with a tightened layer. In certain embodiments, the tightened layer is an exposed surface layer and in other embodiments it is an interior layer. Such methods comprise reacting a plurality of vinyl monomers with a first initiator to form an immature gel. The methods further comprise treating an exposed surface layer of the immature gel with a second initiator prior to the formation of a mature gel, the treated immature gel forming a mature gel with a tightened layer. It will be understood by one of ordinary skill in the art when reviewing this disclosure that these methods are applicable to the formation of a tightened, exposed surface layer or interior layer in gels other than hydrogels.

In certain embodiments, the vinyl monomer is an acrylamide. In additional embodiments, the first and second initiator residues (e.g., sulfate and hydroxy) are the same. In further embodiments, the concentration of the second initiator at the gel surface (in the solvent of the second initiator) is higher (e.g., 2-fold, 5-fold, 10-fold, 20-fold, 30-fold, 40-fold, 50-fold, and up to 100-fold) than the concentration of the first initiator in the plurality of vinyl monomers.

In particular embodiments, treating the exposed surface layer with the second initiator starts three hours, or less, after starting to react the vinyl monomers with a first initiator. In other embodiments, the first or second initiator comprises a persulfate.

In certain embodiments, the methods further comprise treating the immature gel with a helper.

Other aspects are disclosed that relate to a hydrogel comprising at least one exposed surface layer. The at least one exposed surface layer prevents passage of 80% or more of a plurality of particles (e.g., a nucleic acid (including oligonucleotides), glycan, or a peptide, including polypeptides, such as bradykinin) through the at least one exposed surface layer in an aqueous dialysis process of about 12 hours, each of the plurality of particles having an average mass about 1 kilodalton.

In particular embodiments, the hydrogel comprises a vinyl-polymer. In more particular embodiments, the vinyl polymer includes a plurality of polymer-attached initiator residues, such as sulfate and hydroxy.

In certain embodiments, the hydrogel further comprises a plurality of polymer-attached helper residues, e.g., N,N,N',N'-tetramethylethylenediamine lacking a hydrogen atom on a carbon atom.

In additional embodiments, the hydrogel further comprises a combination of a plurality of polymer-attached initiator residues and a plurality of polymer-attached helper residues. In certain embodiments, the vinyl polymer has a plurality of polymer-attached vinyl groups and a plurality of polymer-attached initiator residues. In particular embodiments, the ratio of polymer-attached initiator residues to polymer-attached vinyl groups in at least one portion of the hydrogel is greater than 10, and some instances greater than 100.

A hydrogel is provided that comprises polymerized vinyl monomers. The hydrogel comprises an interior layer of polymerized vinyl monomers and the interior layer has a lower porosity than the porosity of an exposed exterior layer. The interior layer has a ratio of polymer-attached initiator or helper residues to polymer-attached vinyl groups which is greater than 10.

In certain embodiments, the amount of the plurality of particles is less than ten micrograms, and the ratio of the solvent volume in microliters to the exposed layer of the hydrogel in square millimeters is 15 or less. In other embodiments, the amount of the plurality of particles is about one microgram. In further embodiments, the said surface layer prevents the passage of 90% or more of the said plurality of particles. In still more embodiments, the surface layer prevents the passage of 98% or more of the said plurality of particles.

An exposed surface layer comprises vinyl polymer material, the exposed surface layer defining at least one interior layer comprising the vinyl polymer material. The exposed surface layer has a lower porosity than the porosity of the at least one interior layer. Both the exposed surface layer and interior layer have polymer-attached initiator or helper residues; the vinyl polymer material of the exposed surface layer having a higher content of attached initiator or helper residues than the vinyl polymer material of the interior layer.

DESCRIPTION OF THE FIGURES

The following figures are presented for the purpose of illustration only, and are not intended to be limiting.

DETAILED DESCRIPTION

All publications, patent applications, patents, and other references mentioned herein are incorporated by reference in their entirety. In case of conflict, the present specification, including definitions, will control. In addition, the materials, methods, and examples are illustrative only and not intended to be limiting.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below.

1. DEFINITIONS

For convenience, certain terms employed in the specification, examples and claims are collected here. Unless defined otherwise, all technical and scientific terms used in this disclosure have the same meanings as commonly understood by one of ordinary skill in the art to which this disclosure belongs. The initial definition provided for a group or term provided in this disclosure applies to that group or term throughout the present disclosure individually or as part of another group, unless otherwise indicated.

The terms "compound" and "compounds" as used in this disclosure refer to the compounds of this disclosure and any and all possible isomers, stereoisomers, enantiomers, diastereomers, tautomers, pharmaceutically acceptable salts, and solvates thereof.

In general, the compositions of the disclosure can be alternately formulated to comprise, consist of, or consist essentially of, any appropriate components disclosed in this disclosure. The compositions of the disclosure can additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

The articles "a" and "an" are used in this disclosure to refer to one or more than one (i.e., to at least one) of the grammatical object of the article. By way of example, "an element" means one element or more than one element.

The term "or" is used in this disclosure to mean, and is used interchangeably with, the term "and/or," unless indicated otherwise.

The term "about" is used in this disclosure to mean a value – or +20% of a given numerical value. Thus, "about 60%" means a value between 60 minus 20% of 60 and 60 plus 20% of 60 (i.e., between 48% and 72%).

A "hydrogel" or "vinyl hydrogel" is a three-dimensional, semi-solid network of one or more polymers derived from vinyl monomers in which a relatively large amount of water is present in the wet state.

"Vinyl monomers" are molecules having one or more groups of the formula —CH=CH$_2$ that can react with each other or other vinyl monomers to form a polymer. A non-limiting example of a vinyl monomer is vinyl chloride, which can give a plastic is known as "vinyl." Another non-limiting example of a vinyl monomer is acrylamide which can give a gel known as a polyacrylamide gel.

A "pre-gelling solution" is a solution of vinyl monomers prior to the addition of an initiator.

A "gelling solution" is a solution of the vinyl monomers and initiator with or without a helper until it forms a gel.

An "initiator" is a compound that readily forms free radicals that react with a vinyl group under the conditions being used.

"Exposed surface layer" or "exterior layer" or "exterior surface" is used herein to mean a layer or surface of a gel that is in contact (i.e., direct contact) with a liquid or gas phase A "helper" is a molecule that is converted by an initiator into a free radical that reacts in turn with a vinyl group, helping to polymerize vinyl monomers.

A "porogen" is a solvent in which a vinyl monomer but not its corresponding polymer is soluble, leading to pores when the porogen is used as a solvent or cosolvent in a polymerization reaction of the vinyl monomer.

A "surface-only compacted gel" is a gel in which the sizes of the pores are reduced only at one or more exterior surfaces.

As used herein, the term "layer" means an area or zone that has a different polymer concentration from other layers, which can be adjacent to, or not adjacent to, the given area or zone. Adjacent layers can have a gradual difference in polymer concentration from each other or more of a stepwise difference in polymer concentration from each other.

As used herein, the term "vinyl polymer" encompasses any of a group of molecules that are formed by a free radical polymerization reaction of vinyl monomers.

A "tightened surface" is an exterior surface of a gel or plastic at which the sizes of the pores have been reduced by a reaction involving a supplemental (second) initiator.

A "gel" is a solvent-rich composition consisting of a solvent (imbibing solvent) in an insoluble, porous network comprising one or more polymeric organic molecules, where the solvent can be water, giving a "hydrogel", a nonpolar organic solvent, giving "nonpolar gel" or a polar organic solvent or a solution of water and an organic solvent, giving a "semipolar gel."

As used herein, the term "lower porosity" means a surface or layer that has pores that are smaller in size relative to another surface or layer to which the surface is compared.

A "monolith" is a gel or plastic in a nonparticulate form.

A "plastic" is a collapsed gel derived from polymerized vinyl monomers, in which all or essentially all of the polymerizing solvent has departed leaving a residue of condensed (aggregated) vinyl polymers with or without pores in the bulk plastic structure.

A "composition" or "polymer composition" is a gel or plastic derived from free radical polymerization of vinyl monomers.

"MALDI-TOF-MS" is matrix-assisted laser desorption ionization time-of-flight mass spectrometry.

2. GEL COMPOSITIONS

The disclosure provides, in part, polymer compositions that have homogeneous and abundant pores at an exposed surface layer (exterior layer), an internal layer, or throughout, where the composition comprises a gel (hydrogel, nonpolar gel, or semipolar gel) or plastic. Both on a small and large scale, the employment of compositions with layers described herein in a chromatographic mode (e.g., particles or monoliths) provide separations of particles based on size or by other means. The present disclosure provides gels and plastics having a layer or layers useful for many applications including, but not limited to, compositions for chromatography, dialysis or electrophoresis, vehicles for drug delivery, and vehicles for handling and cleaning cells.

The vinyl polymers as described herein can be formed from a diversity of water-soluble vinyl monomers. Non-limiting examples of vinyl monomers that can be used to make hydrogels are acrylamide, N-alkylacrylamides, N-methylacrylamide, N,N-dialkylacrylamides, hydroxyalkyl methacrylates, N-vinyl-2-pyrrolidone, vinyl alcohol, aminoethyl methacrylate, 4-vinylpyridine, acrylic acid, methacrylic acid, methoxyethyl methacrylate, 2,3-dihydroxypropyl methacrylate, and hydroxyethoxyethyl methacrylate. General and specific examples of multivinyl monomers are bis-acrylamides, N,N'-methylenebisacrylamide, N,N'-(1,2-dihyroxyethylene)bis-acrylamide, N,N'-diallyltartardiamide, ethylene glycol dimethacrylates, and 1,4-bis(acryloyl)piperazine. It is recognized that some vinyl monomers are soluble in both organic solvents and water and thereby can be used to form polar or semipolar gel compositions.

Non-limiting examples of vinyl polymers of nonpolar or semipolar gels or plastics described herein include, but are not limited to, polyethylene, polybutadiene, polypropylene, polystyrene, polyvinyl chloride ("PVC"), polyvinyl acetate ("PVac"), poly(methyl methacrylate), polyphenylsulfone, polyamide imide, polysulfone, polyvinyl alcohols ("PVA"), and polyacrylonitrile.

Aspects of the disclosed gels include compositions in which an exterior layer defines at least one interior layer comprising the vinyl polymer. The interior layer(s) can comprise pendant (polymer-attached) vinyl groups, which are typically lower in content than in a tightened exterior layer. In these latter embodiments, the exterior layer has smaller pores than the pores of the at least one interior layer, and thereby is said to have a lower porosity.

An initiator is used to form the vinyl and plastic polymers. Several non-limiting useful initiators for forming vinyl gels and plastics include ambient initiators, heat-dependent initiators, and light dependent initiators. Ambient initiators are spontaneously effective at initiating the formation of a gel in a matter of hours or less at room temperature. In some examples, ambient initiators also are used with helpers, such as N,N,N',N'-tetramethylethylenediamine (TEMED). Heat-dependent initiators require heating significantly above room temperature to readily form free radicals, and thereby are classified as an initiator only under these conditions. Non-limiting examples of heat-dependent initiators are hydrogen peroxide and benzoyl peroxide. Light-dependent initiators, such as riboflavin and riboflavin phosphate, require intense exposure to a UV lamp to function as initiators. Other examples of initiators are t-butyl hydroperoxide, cumene hydroperoxide, and various azo-compounds such as azodiisobutyronitrile, azodiisobutyramidine dihydrochloride and dimethylazodiisobutyrate.

As described above, a "helper" is a molecule that helps an initiator to polymerize vinyl monomers to form a vinyl polymer. Helpers can be used in combination with an initiator to catalyze polymerization. Examples of helpers include, but are not limited to, N,N,N',N'-tetramethylethylenediamine (TEMED), N,N-dimethylethylenediamine, 3-dimethylamino-n-propylamine, 3-dimethylaminopropionitrile, N-(n-butyl)dimethylamine, and N,N'-dimethylpiperazine.

In certain embodiments, the gel has a decreasing gradient or content of polymeric network from the exterior surface layer to at least one interior layer or portion of the gel. A corresponding, increasing gradient thereby is formed with regard to the pore size, where the size of the pores increases from the exterior layer to interior layers or portions. Furthermore, gradients of pendant initiator residues and/or pendant helper residues can be formed as well, the number of pendant residues decreasing from the exterior layer to the interior layer or portion.

The disclosed gels therefore allow for gels having exterior layers having pores that are smaller than in the interior of the gel. The smaller pores of the exterior layer allow for the retention of particles at the exterior surface, such as (in the case of hydrogels) peptides, including polypeptides, nucleic acids, peptidomimetic compounds, glycans, or other molecules, with little or no loss of particles. In the hydrogel embodiments, the surface layer is hydrophilic and decreases the association (i.e., stickiness) of the particles in water with the surface relative to what membrane surfaces can provide.

The porosity of the exterior layer can be determined by using size exclusion assays. Such assays determine the minimum size of a particle, such as peptides, including polypeptides, nucleic acids, peptidomimetic compounds, glycans, or other molecules that will not pass through an exterior layer. In such assays, the size and uniformity of the pores is determined by testing different particles that vary in their size, to see which ones are unable to pass through the surface, and to what degree, by diffusion from a solution in contact with the surface.

An example of a size exclusion assay is as follows. The recovery of a trace, adsorption-prone particle using a particular exterior surface can be determined using a peptide such as a small amount of bradykinin in an aqueous sample. This procedure is referred to herein as the "bradykinin test." The bradykinin test establishes the uniformity of pore size of the exterior layer and the small size of the pores of one of a disclosed hydrogel composition having the characteristics of unusually uniform and small pores when compared to the surface of known hydrogels. The result that is achieved has not been demonstrated after prolonged contact of dilute bradykinin solutions with known membranes or hydrogels.

One can employ a known membrane that is sufficiently porous to remove salt or a small solute from a larger particle targeted for retention by dialysis. Prolonged contact is important for thorough desalting, but has the drawback of losing targeted particles unless they are very big. Targeted particles of moderate size to be desalted, such as peptides having masses near 1000 Daltons, tend to be lost in such dialysis as the peptides either escape through pores due to the lack of uniform, small pore sizes or the peptides adhere to the membrane in known dialysis/size exclusion technology. As demonstrated herein, these drawbacks are not found in a presently disclosed gels and hydrogels, which have uniformly smaller pores.

In certain embodiments, the disclosed gels and plastics take on forms such as, but not limited to, a rod, sheet, sphere, particle, shell, membrane, net, or monolith. In each case, at least part of the gel or plastic can be covalently bonded to a solid or semi-solid bulk surface functioning as a substrate. This can be achieved by providing a substrate surface that has exposed covalently-attached vinyl groups.

Figure 3:
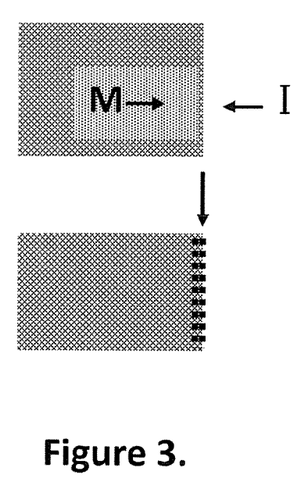
FIG. 3 is a diagrammatic representation of a gel illustrating tightening of an exterior layer by opposing migration of residual free monomer (M) and second initiator (I) molecules at the nascent stage of development of an exterior surface of a gel formed by polymerization of vinyl monomers.
Figure 4:
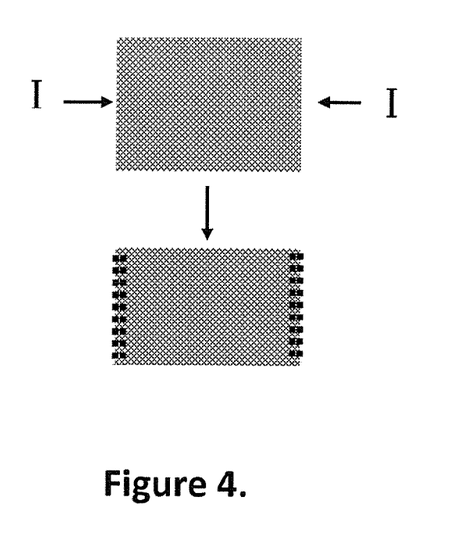
FIG. 4 is a diagrammatic representation of a gel having two tightened exterior layers.
Figure 5:
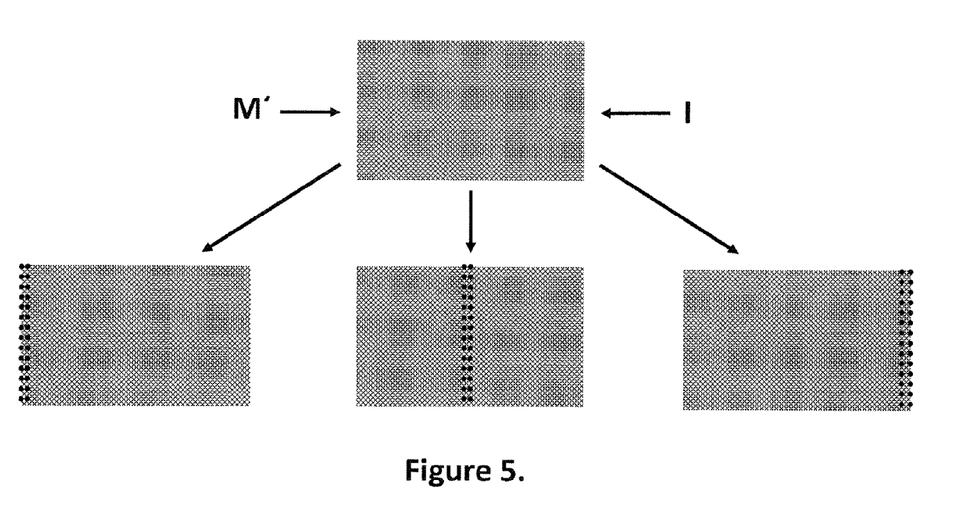
FIG. 5 is a diagrammatic representation of gels having a tightened layer on the exterior or in the interior of the gels.

Aspects of the compositions disclosed herein provide gels comprising polymerized vinyl monomers. The gels comprise an inner layer of polymerized vinyl monomers, where the inner layer can have smaller or larger pores than the pores of an exterior layer. In these aspects, the exterior layer contacts a different phase (i.e., liquid or gas) than any interior layer of the gel. As shown in FIGS. 3 and 5, the tightened layer (dark dots) can be at any point in the hydrogel where supplemental initiator molecules or helpers and residual or supplemental monomers meet. Therefore, the tightened layer can be an exposed surface layer (exterior layer) as described herein or it can be located within the interior of the gel. As illustrated in FIG. 4, there can also be two, tightened exterior layers that are formed in this way.

Also disclosed are hydrogels in which at least one exterior layer prevents passage of 80% or more of a plurality of particles through the at least one exterior layer. In certain embodiments, the exterior layer prevents about 80% to about 90%, about 90% to about 100%, about 85% to about 95%, or 85% or more, 95% or more, or 99% or more of the particles from passing through the exterior layer.

In such aspects, the particles are retained during an aqueous dialysis process performed over a period of about 2 or more hours, of about 6-12 hours or over a period lasting much more than 12 hours.

In addition, the particles in the dialysis procedure can have an average mass of about one kilodalton, less than one kilodalton, one kilodalton to 10 kilodaltons or 10 or more kilodaltons. In these aspects, exemplary particles include, but are not limited to, peptides, including polypeptides, nucleic acids, peptidomimetic compounds, glycans, and small organic molecules. A representative particle is bradykinin.

Aspects of the gels and plastics disclosed herein provide compositions comprising polymerized vinyl monomers having a plurality of pendant (polymer-attached) vinyl groups and a plurality of pendant initiator or helper residues. In certain embodiments, the ratio of initiator or helper residues to pendant vinyl groups in at least one portion of the gel or plastic is greater than 10, from 10 to 100, from 100 to 200, from 200 to 300, from 300 to 400, from 400 to 500, from 500 to 600, from 600 to 700, from 700 to 800, from 800 to 900, and from 900 to 1,000. Other exemplary ratios are from 1,000 to 2,000, from 2,000 to 3,000, from 3,000 to 4,000, from 4,000 to 5,000, from 5,000 to 6,000, from 6,000 to 7,000, from 7,000 to 8,000, from 8,000 to 9,000, and from 9,000 to 10,000.

In certain embodiments, the concentration of initiator used to form the gel are varied. Exemplary concentrations of initiator are from 0.1 mg/ml to 0.2 mg/ml, from 0.2 mg/ml to 1.0 mg/ml, and from 1.0 mg/ml to 10 mg/ml. In certain embodiments, more than one initiator is used. In such embodiments, the concentration of a first initiator is any of the concentrations disclosed herein and the concentration of a second initiator is any of the concentrations disclosed herein. In further embodiments where two initiators are used to produce a gel with a tightened exterior surface, the concentration of a second initiator is at least two times greater than concentration of the first initiator, at least three times greater, at least four times greater, at least five times greater, at least six times greater, at least seven times greater, at least eight times greater, at least nine times greater, and at least ten times greater.

In certain embodiments, the concentration of helper is varied. Exemplary concentrations of helper are from 0.1 mg/ml to 0.2 mg/ml, from 0.2 mg/ml to 1.0 mg/ml, and from 1.0 mg/ml to 10 mg/ml.

3. METHOD OF MAKING GELS

Disclosed are methods of making a gel having a tightened exterior layer or a tightened interior layer. These methods comprise reacting a plurality of vinyl monomers with a first initiator or helper. The first initiator allows for the formation of an immature gel. The immature gel has at least one exterior layer that can be treated with a second initiator to tighten it prior to the formation of a mature gel. Upon treatment with the second initiator, the immature gel forms a mature gel with an exterior layer that has been tightened (i.e., the exterior layer has smaller pores). In some cases, the immature gel is treated with a second initiator in combination with a helper.

Vinyl gels are formed by a free radical polymerization reaction of water-soluble or organic-soluble monovinyl and multivinyl (especially divinyl) compounds, which are referred to herein as "vinyl monomers." A reaction of this type can be initiated by adding a compound called an "initiator." The initiator is a compound that readily forms free radicals under the conditions being used. The formed free radicals of the initiator then initiate the free radical polymerization reaction of the vinyl monomers by directly or indirectly (via a helper) converting one or more of the vinyl compounds into radicals.

Methods are especially disclosed in which a reaction that gives a vinyl gel is based on use of first initiator such that an intermediate, nascent (very immature) exterior layer has formed. At this point a solution containing a second initiator is applied to the nascent exterior layer. The second initiator both reacts with pendant vinyl groups at least at the nascent exterior gel surface, and with vinyl monomers diffusing towards this surface from an inner region of the gel. This method yields an exterior layer with a higher concentration and crosslinking of gel polymer, controlling and reducing pore size there in a uniform way. The exterior layer is denser (more compact) in its content of vinyl polymer than an interior layer or portion. In particular embodiments, the contact time for the second initiator is limited, so as to prevent migration of the second initiator throughout the entire gel. In these cases, the concentration of the gel polymer is higher at the exterior layer where the gel has been exposed to a second initiator than it is in an interior region of the gel.

Without being held to any particular theory, FIG. 3 demonstrates an exterior surface that has been tightened by application of a first and second initiator. A nascent hydrogel (grey dots) has been formed by the reaction of a first initiator (not shown) and vinyl-monomers. A second initiator I is added to the gel at the surface and migrates into the gel (←). The hydrogel has residual free vinyl monomers M migrating toward the nascent vinyl-derived surface (direction of arrow). The vinyl-monomers M migrate from the interior of the gel (→). A vinyl-derived, tightened surface (dark dots) is formed by the reaction of the residual, free M and added I molecules.

As in FIG. 3, the following is not to be construed as limiting the compositions or methods disclosed herein to any particular theory of how tightened surfaces form. The disclosure also provides methods of preparing a gel having two opposing, tightened exterior layers compared to an interior layer or portion. In one method, two opposing surfaces of an immature gel are treated at the same time with a second initiator I, as illustrated in FIG. 4. A nascent gel (grey dots) is formed that contains free monomers M that migrate to the surface of the gel (←→). In these embodiments, the free monomers M in the gel react at the surface of the gel with the initiator added I to form two or more tightened surfaces (dark dots).

In another embodiment, a tightened exterior layer or tightened interior layer is formed by exposing one exterior layer to a solution of an initiator and exposing the other exterior layer to a solution of a vinyl monomer. In this embodiment, the second initiator and vinyl monomer migrate toward one another, increasing the density of polymer in the gel where the vinyl monomer and initiator meet, which may be at an exterior layer or an interior layer (FIG. 5). In FIG. 5, the concentration of initiator is sufficient to polymerize the added monomer and form a tightened (dark dots) layer compared to another layer. For this embodiment it is preferred to have formed a mature or nearly mature gel before the addition of supplemental monomer and supplemental initiator.

In certain aspects, the disclosed methods also include adding urea, formamide, polyethylene glycol, sugars, oligosaccharides, polyvinylpyrolidone, polyacrylamide, salts, buffers, or polypeptides to the pre-gelling solution, thereby regulating the viscosity, vinyl monomer diffusion during gel formation, interactions of the hydrogel polymer chains during gel formation, or degree of polymerization of the gelling solution.

In particular embodiments, the formation of the vinyl gels includes applying a first initiator, and interrupting the polymerization reaction caused by this initiator prior to its completion, but after an intermediate, exterior surface layer has formed, and applying a solution containing a second initiator to the said gel surface. The second initiator both reacts with pendant vinyl groups at least at the exterior gel surface, and with vinyl monomers diffusing toward the surface layer from an inner region of the gel. This yields an exterior layer with a higher concentration and crosslinking of gel polymer, controlling and reducing pore size there in a uniform way, forming what can be described as a denser, tighter or more compacted surface. If the contact time for the second initiator is limited, so as to prevent migration of the second initiator throughout the entire gel, then the concentration of the gel polymer in the gel is higher at the exposed, double-initiated gel surface than it is in an interior region of the gel.

Furthermore, a glass surface can be reacted with methacryloxypropyl trichlorosilane in order to bestow it with vinyl groups. In this case, a gel is formed in any particular shape, including but not limited to, rod, tube, sheet, cone, sphere, rectangle, square, or other shape allowed by a mold or environment. A gel can be formed as a sheet by pouring the gelling solution into a flat or curved mold, or between two plates.

A sphere gel can be formed via a suspension polymerization method where the spheres of gelling solution are suspended in a nondissolving solvent or air as polymerization proceeds, with a subsequent interruption step involving exposure to a second initiator. When the spheres are formed in air, the immature spheres can encounter a gas or mist, containing a second initiator, or fall into a nondissolving solvent containing a second initiator.

A sphere can be a porous (FIG. 1H) or nonporous chromatographic or other sphere. The gel can be formed as a shell on some other spherical, tubular or rod-like surface. The sphere can have channels (very large pores, e.g. 1 µm) formed on its interior from the action of a porogen, where the sphere has a tightened inner exterior layers surrounding the inner channels and also located at the outer, exterior layer of the gel sphere (FIG. 1J).

The gel can be formed on a membrane or net surface. The gelling solution can contain a porogen and be fabricated in a nonparticulate form leading to a monolith gel or plastic. In this latter case, the initiator at the interruption point would be flowed through the immature gel in order to make contact with the inner, exposed surface of the immature gel in order to compact (tighten) the gel there.

Figure 1:
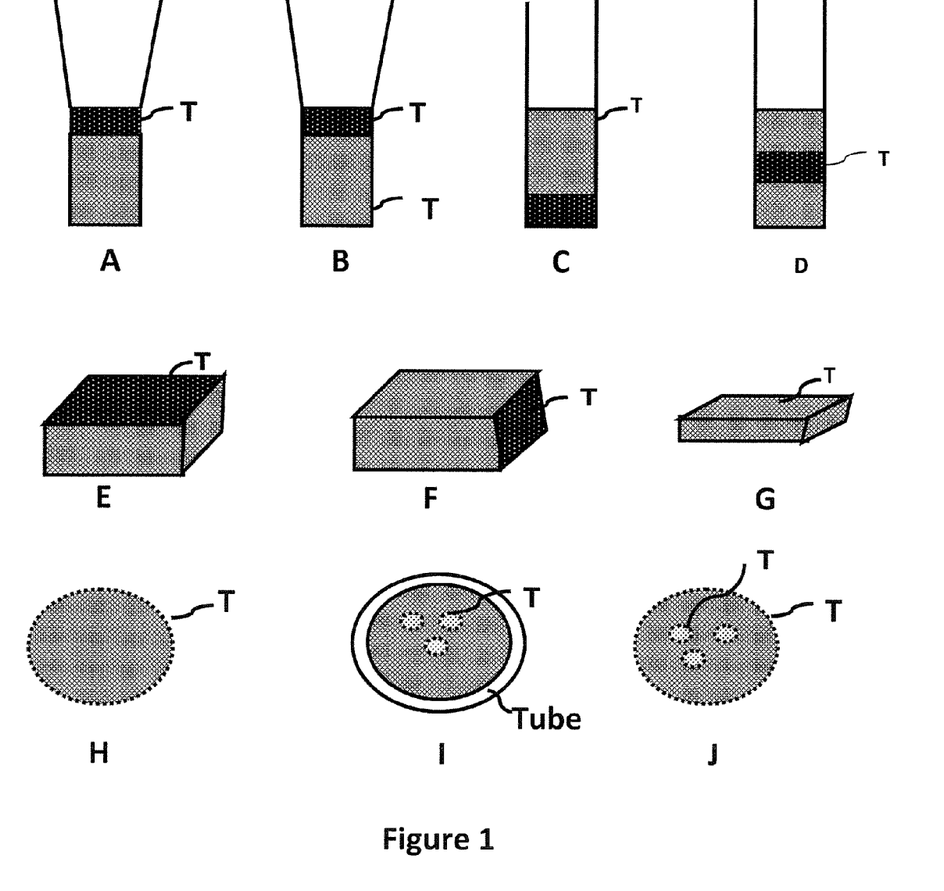
FIG. 1A is a diagrammatic representation of a hydrogel showing a flared tube containing a gel tightened on one exterior surface.
FIG. 1B is a diagrammatic representation of a gel showing a flared tube containing a gel tightened on two exterior surfaces.
FIG. 1C is a diagrammatic representation of a gel showing a straight tube containing a gel tightened on one exterior surface.
FIG. 1E is a diagrammatic representation of a slab gel tightened on a side exterior surface.
FIG. 1D is a diagrammatic representation showing a straight tube containing a gel tightened at an interior layer.
FIG. 1F is a diagrammatic representation of a slab gel tightened on an end-exposed surface.
FIG. 1G is a diagrammatic representation of a slab gel tightened throughout the gel.
FIG. 1H is a diagrammatic representation of a gel showing a cross-section of a spherical gel tightened on its outer exterior surface (dark dots).
FIG. 1I is a diagrammatic representation of a gel showing a cross-section of a spherical gel in a tube where the gel has tightened inner, exterior surfaces forming channels represented by dark dots outlining the channels.
FIG. 1J is a diagrammatic representation of the cross-section of a spherical gel where the gel has tightened inner, exterior surfaces forming channels represented by dark dots outlining the channels and an outer exterior surface that has been tightened (dark dots).

Gels can also be formed as slabs (FIGS. 1E-1G). Slabs can have exterior surface layers that are tightened (smaller pores compared to an interior layer or portion) on a side surface (FIG. 1E), or on an end-exterior surface (FIG. 1F). The slabs also can be tightened throughout (FIG. 1G).

In the case of a gel shaped as a rod, the rod can be formed at the end of a glass tube by dipping a vinyl-bonded glass tube into a gelling solution to take up the gelling solution by capillary action, and then later contacting either or both surfaces of the gelling solution with an initiator or initiator plus helper at an immature point when an exterior gel surface has formed but the gelling reaction is incomplete.

In certain instances, the rod is formed in the end of a tube (that can be the small end of a funnel) such that it can also be described as a "plug" useful for evaporative dialysis. The plug can be formed in a straight or flared tube (FIGS. 1A-1D).

Some embodiments (e.g. FIGS. 1A-1D) can be used to accomplish evaporative dialysis. This is accomplished by placing aqueous sample solution in a funnel or tube that is plugged at its tip with the hydrogel according to this disclosure, and then keeping this tip in water while the inner part of the funnel or tube is exposed to air or vacuum, enabling the solution to evaporate as the dialyzable substances in it pass into or through the plug for removal, while the non-dialyzable substances are retained above the gel surface. The tendency of the evaporating solution to not evaporate to dryness is an advantage of the device. A hydrogel-plugged tube can be used to extract dialyzable substances from an aqueous sample either by dipping the tip of the tube into the sample, or by placing the sample into the tube. Passage of a substance of interest into or through the hydrogel plug can be sped up, at least when one substance of interest in an aqueous sample has a charge, by electrophoresis, where a current is applied through the hydrogel. When such evaporative dialysis is done in a glass tube or funnel, it is preferred that the vinyl polymer of the hydrogel is bonded covalently to the glass.

In some examples, an exterior surface-only compacted gel is formed where a second initiator is applied to an immature exterior surface layer for a limited period of time, or in a limited concentration. This leads to an exterior surface layer which is compacted relative to an interior region that is less exposed. Without being held to any particular theory of how this is accomplished, the second initiator reacts readily with vinyl groups in the exterior surface layer, yielding a gel where the ratio of pendant (i.e., polymer-attached) vinyl groups to vinyl polymer is higher in an interior portion of the gel than in the compacted exterior surface layer. In the exterior surface-only compacted form, the compacted surface layer of the gel has a higher ratio of polymer-attached initiator, helper, or initiator plus helper residues to pendant vinyl groups than an interior portion of the gel.

In a fully-compacted form of the present gel, conditions are used so that the second initiator permeates the entire gel, perhaps along with helper. The gel is found, using the above methods, to be deficient in pendant vinyl groups throughout, while enriched throughout in polymer-attached initiator, helper, or initiator plus helper residues relative to corresponding slices of a second gel prepared in the same way but excluding exposure to a second initiator. The fully-compacted gel has a high ratio of pendant initiator, helper, or initiator plus helper residues to pendant vinyl groups throughout the gel.

The two-step initiator method of the disclosure achieves control and reproducibility of the porosity of an exterior layer. Limited polymerization in the first reaction stage, prior to interruption by the second initiator, builds up a uniform, loose skeleton of vinyl polymer that is locked in place as it is uniformly cross-linked and filled in at least at the targeted exterior surface by second initiator and/or helper free radicals reacting both with pendant vinyl groups and triggering polymerization of unreacted vinyl monomers. The helper in the second stage can be furnished by residual helper from the first stage of gel formation, and by additional helper accompanying the second initiator. This method of preparing exterior gel surfaces can be used to fabricate external surfaces that are controllably and reproducibly uniform in pore size regimes of even medium and larger pore sizes consistent with the pore range of gels derived from vinyl monomers.

When fabricated in a form that has a relatively large, initiator-compacted exterior layer such as that which can provided by a large sheet, sphere, shell, membrane, net, porous chromatographic particle, or monolith column, the composition as a hydrogel can be used advantageously to handle, fractionate, extract, concentrate or recover selected components of large aqueous samples such as samples involved in hemodialysis, preparative drug sterilization, or preparative purification of macromolecules such as proteins, nucleic acids and oligosaccharides for commercial purposes or improved health care. Such structures can be formed utilizing molds or substrates composed of glass, plastic or any material that is compatible with the hydrogel. Similarly, the composition as a plastic can provide a novel surface in terms of noncovalent interactions or reduced pore sizes, even overcoming the general problem of micropores of plastics when used for chromatography of small particles.

The free radical polymerization of vinyl monomers to form gels is initiated by attachment of an initiator free radical or helper free radical to a vinyl monomer. The initiator or helper free radical also can attach to a pendant vinyl group on the vinyl polymer that arises when one vinyl group of a divinyl monomer (cross-linking agent) is incorporated into the vinyl polymer. Thus, the vinyl polymer has initiator or helper residues on it, including initiator or helper secondary residues that arise from any further reactions of a given residue. In one non-limiting example of the case of ammonium persulfate as an initiator and TEMED as a helper in the formation of vinyl polymers, the persulfate forms a sulfate radical that attaches to a vinyl monomer and pendant vinyl, and also converts TEMED into a radical that attaches to vinyl monomer and pendant vinyl. Attached sulfate can hydrolyze to form an attached hydroxy as a secondary initiator residue.

The gels can also be used to prepare plastic exterior surfaces which are porous or nonporous derived from polymerization of non-polar vinyl monomers such as styrene and divinylbenzene using an organic-soluble initiator such as benzoyl peroxide, leading to similar advantages and scope of bulk forms, while adding the advantages of utility directed toward the separation of non-polar substances by size in non-aqueous solvents, or by size or adsorption in semiaqueous solvents. Such materials also can be used to handle, fractionate, extract and concentrate semiaqueous samples (e.g., about 1% to about 99% water in the presence of an organic, water-soluble co-solvent such as methanol or acetonitrile) since the co-solvent lowers the surface tension between the non-polar surface and the water-containing solution. The non-polar surface can also be rendered water-friendly by chemical modification with ionic groups to further broaden the applications for the surface, such as for ion exchange chromatography, e.g., in combination with homogeneous pores. The disclosure can also be practiced with moderately-polar, ionic and liganded vinyl compounds.

Plastic exterior surfaces can be prepared using the following procedure as an exemplary, non-limiting guide. A polystyrene-divinylbenzene monolith for chromatography can be prepared by preparing a polymer mixture of 2 µl of tetrahydrofuran, 5 µl of styrene, 5 µl of divinylbenzene, 13 µl of decanol (porogen) and 0.25 mg of initiator azobisisobutyronitrile. A silanized fused silica capillary with an internal diameter of 100 µm is filled with the mixture using a syringe. Septa are placed at both ends of the capillary to seal it and the capillary is heated for less than 20 hours (less time than for essentially complete polymerization) at 60° C. The septa are moved and the capillary is flushed with methanol or aqueous methanol, and then an aqueous solution of initiator ammonium persulfate, which yields, after standing for a period of time, a polystyrene-divinylbenzene monolith tightened on the exterior surfaces of its inner, porogen-formed channels.

EQUIVALENTS

Those skilled in the art will recognize, or be able to ascertain, using no more than routine experimentation, numerous equivalents to the specific embodiments described specifically herein. Such equivalents are intended to be encompassed in the scope of the following claims.

EXAMPLES

A non-limiting representative hydrogel according to the disclosure was prepared and used to obtain the MALDI-TOF-MS spectra of bradykinin as follows.

1. Materials and Instrumentation

Methacryloxypropyl trichlorosilane was from Gelest (MOPT, catalog #A SIM 6487-2, Morrisville, Pa.), acrylamide (99.9%, catalog #161-0100), N,N-methylene-bis-acrylamide (Bis, electrophoresis purity, catalog #161-0200), ammonium persulfate (APS, catalog #161-0700) and N,N,N',N'-tetramethylethylenediamine (TEMED, catalog #161-0800) were purchased from Bio-Rad Laboratories (Hercules, Calif.). Bradykinin triacetate (>98%, catalog #B3259) and α-cyano-4-hydroxycinnamic acid (CCA) were from Sigma (St. Louis, Mo.). Ammonium acetate (>99%, catalog #09689) was from Fluka (Milwaukee, Wis.). Acetic acid, glacial (catalog #A490-212), methanol (optima, catalog

A454-4), ethanol (95%, denatured, catalog #49351-1), and disposable Pasteur pipets (5¾", catalog #13-678-20A) were from Fisher Scientific (Pittsburgh, Pa.).

Nitrogen gas (UHP, product #13J27) was from Medical-Technical Gases, Inc. (Medford, Mass.). Water was purified by re-distillation and then deionization with two Barnstead cartridges (catalog #D0813 and D0809). The loading syringe (0.5 µl, catalog #86250) was from Hamilton Inc. Reno, Nev.

The voltage controller for electrophoresis (model 3000-90) was from E-C Apparatus Co. (Medford, Mass.). For ultrasonication, a Transonic Sonicator (model 820/H, 9313) from LAB-LINE (Melrose Park, Ill.) was used. The UV spectrometer, HP-1B with a HP UV-visible system Chem-Station (model G1103) was from Hewlett Packard (Palo Alto, Calif.). MALDI-TOF-MS was done on a Voyager DE-STR from Applied Biosystems (Framingham, Mass.).

2. Preparation of Gelling Solution

Acrylamide (190 mg) and N,N-methylene-bis-acrylamide (10 mg) were dissolved in 0.25 ml of 0.1 M ammonium acetate buffer, pH 7.0. This solution, and separately 10 ml of water, was degassed by ultrasonication for 15 min followed by vacuum in a desiccator (50 mm Hg, about 6.6 kPA) for 2 hr, giving AB. Ten µl of TEMED was added to 390 µA of degassed water, giving T. Ten µl of T was added to AB followed by mixing with nitrogen bubbles for five sec to give ABT. Ten µl of APS was dissolved in 2.5 ml of degassed water to give APS-1. Five µl of APS-1 was added to 95 µA of ABT followed by five sec of nitrogen bubbles at 15 standard cubic feet per hr to yield the gelling solution (GS).

3. Preparation of MOPT-Activated Pipets

A Pasteur pipet (Pipet-1) was cut at both ends to an overall length of 2.2 inches, such that the internal diameter of the small opening was about 1 mm, yielding a shortened pipet (Pipet-2). After the Pipet-2 was cleaned by ultrasonication for 15 min each in acetone, methanol and water, it was soaked in 5% HCl for 4 hr, washed with water, and kept at 120° C. overnight. Ethanol was adjusted using a pH meter to pH 5.0 with acetic acid, giving acidic ethanol, which was used as follows within 10 min. After cooling to room temperature, Pipet-2 was placed in MOPT: acidic ethanol, 1:5, v/v, for 1 hr, washed with ethanol, dried with a nitrogen stream for 1 hr, and stored under nitrogen as "Pipet-3." See Peterson, et al. (2003) *Anal. Chem.* 75:5328-5335.

4. Preparation of Gel in Pipet

Under nitrogen (nitrogen bag) and at high relative humidity (>80%), 5 µl of GS was pulled into a loading syringe, 2 µl was ejected to waste, and 2 µl was dispensed downward into the tip of vertically-mounted (tip down) Pipet-3, so that GS reached the tip of the pipet, giving Pipet-4. After 2 hr, 30 mg of APS was dissolved in 0.3 ml of degassed water with pipet mixing, giving APS-2, and 2 ml of APS-2 was dispensed directly onto the "precursor gel" in Pipet-4. This yielded Pipet-5 after 24 hr, which was stored until use in a sealed plastic bag containing a small volume of water (e.g., a one pint bag containing 5 ml of water). A corresponding "Pipet-6" was prepared that was not tightened with APS-2.

5. Evaporative Dialysis of Bradykinin

Ten µl of a solution of bradykinin triacetate in water (100 µg/ml, "Bradykinin Stock Solution") was loaded onto the top surface of Pipet-5 which was held by a plastic ring, allowing Pipet-6 to float vertically in water with the lower part of its gel in contact with the water. Pipet-5 was floated in a beaker containing 1000 ml of water, and magnetic stirring was commenced, resulting in Pipet-5 moving in a circular path. After 12 hr, the volume of the bradykinin solution was observed to be 1 µl by adding 1 µl of water using a syringe fitted with a plastic tube and pulling back 2 µl. This was followed by rinsing the top of the hydrogel with 4 µl of water twice. Combining these 3 solutions gave a 10 µl sample of "Recovered Bradykinin-3" Similarly bradykinin was evaporatively dialyzed in Pipet-6 and similarly recovered therefrom, giving "Recovered Bradykinin-2."

6. Measurement of Bradykinin by MALDI-TOF-MS

Two mg of CCA was dissolved in methanol: water, 1:1, v/v, 0.5 µl of which was combined with 0.5 µl of Recovered Bradykinin-3, which in turn was loaded onto a MALDI plate, yielding "spot-3" after air drying for 5 min. Similarly "spot-2" was obtained from Recovered Bradykinin-2, and spot 1 from the Bradykinin Stock Solution. MALDI-TOF-MS spectra in the positive ion mode were obtained from the three spots using the following settings: relative intensity for the nitrogen laser was 2200; reflectron mode with grid at 68, and source delay time 230 nsec.

Figure 2:
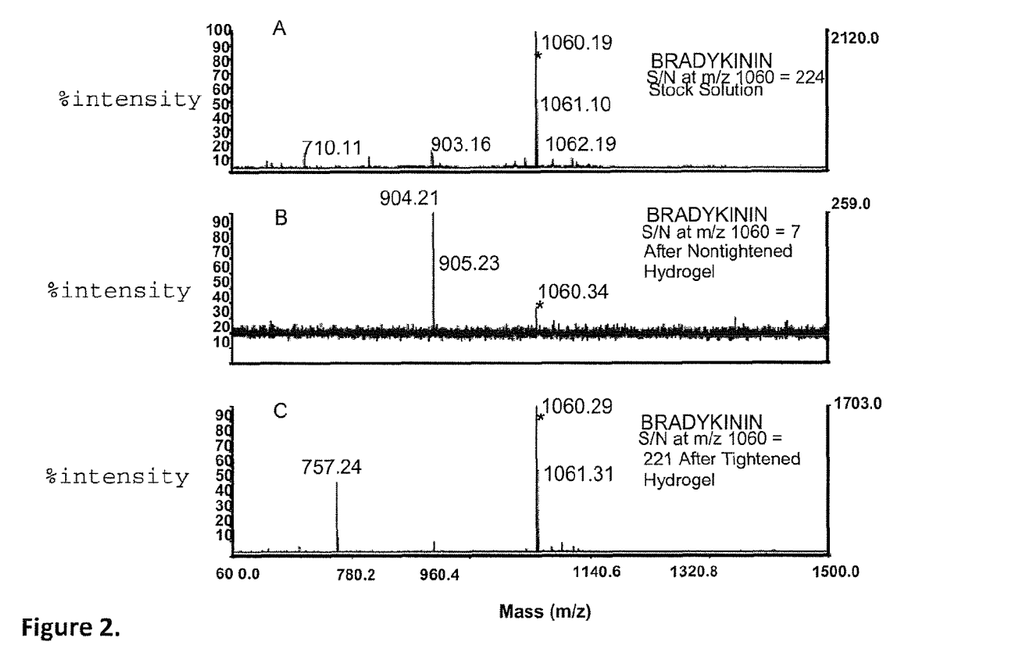
FIG. 2A is a schematic representation of a MALDI-TOF-MS spectrum of bradykinin from stock bradykinin solution.
FIG. 2B is a schematic representation of a MALDI-TOF-MS spectrum bradykinin from a stock solution after evaporative dialysis using a non-tightened gel.
FIG. 2C is a schematic representation of a MALDI-TOF-MS spectrum of bradykinin from a stock solution after evaporative dialysis on a tightened gel.

The recovered solutions, after dilution with water back to 10 µl, were subjected to MALDI-TOF-MS, giving the spectra shown in FIG. 2B and FIG. 2C, respectively. The original stock solution of bradykinin was analyzed similarly, giving the spectrum shown in FIG. 2A. As seen, the recovery of bradykinin from Pipet-5 was 99%, whereas it was 3% from Pipet-6.

What is claimed is:

1. A hydrogel, the hydrogel comprising an exposed surface layer of polymerized vinyl monomers forming a vinyl polymer and an interior layer of polymerized vinyl monomers forming a vinyl polymer, the exposed surface layer having a lower porosity than the porosity of an interior layer; wherein both the exposed surface layer and interior layer comprise one of the following: 1) a plurality of polymer-attached initiator residues, 2) a plurality of polymer-attached helper residues, or 3) a combination of polymer-attached initiator residues and polymer-attached helper residues, and wherein the vinyl polymer of the exposed surface layer has a higher content of 1), 2) or 3) than the vinyl polymer of the interior layer and the porosity of the exposed surface layer allows retention of a particle of about 1 kDa.

2. The hydrogel of claim 1, wherein the plurality of polymer-attached initiator residues comprises two different initiator residues.

3. The hydrogel of claim 1, wherein the plurality of polymer-attached initiator residues comprises sulfate or hydroxy.

4. The hydrogel of claim 1, wherein the plurality of polymer-attached helper residues comprises N,N,N',N'-tetramethylethylenediamine lacking a hydrogen atom on a carbon atom.

5. The hydrogel of claim 1, wherein the vinyl polymer of the interior layer or the exposed surface layer has a plurality of polymer-attached vinyl groups.

6. The hydrogel of claim 5, wherein a ratio of polymer-attached initiator or helper residues to polymer-attached vinyl groups in at least one portion of the hydrogel is greater than 10.

7. The hydrogel of claim 6, wherein a ratio of polymer-attached initiator or helper residues to polymer-attached vinyl groups in at least one portion of the hydrogel is greater than 100.

8. A hydrogel comprising polymerized vinyl monomers, the hydrogel comprising an interior layer of polymerized vinyl monomers, the interior layer having a lower porosity than the porosity of an exposed exterior layer, and the interior layer having a ratio of polymer-attached initiator or helper residues to polymer-attached vinyl groups which is greater than 10, wherein the porosity of the exposed exterior layer allows retention of a particle of about 1 kDa.

* * * * *